(12) United States Patent
Hishiki et al.

(10) Patent No.: US 8,596,465 B2
(45) Date of Patent: Dec. 3, 2013

(54) CERAMIC FILTER

(75) Inventors: Tatsuya Hishiki, Nagoya (JP); Ichiro Wada, Kariya (JP)

(73) Assignee: NGK Insulators, Ltd., Nagoya (JP)

( * ) Notice: Subject to any disclaimer, the term of this patent is extended or adjusted under 35 U.S.C. 154(b) by 77 days.

(21) Appl. No.: 12/855,753

(22) Filed: Aug. 13, 2010

(65) Prior Publication Data

US 2010/0300960 A1    Dec. 2, 2010

Related U.S. Application Data

(63) Continuation of application No. PCT/JP2009/054433, filed on Mar. 9, 2009.

(30) Foreign Application Priority Data

Mar. 26, 2008 (JP) ................................. 2008-082068
Nov. 26, 2008 (JP) ................................. 2008-300579

(51) Int. Cl.
    *B01D 71/02*          (2006.01)
    *B01D 71/00*          (2006.01)

(52) U.S. Cl.
    USPC ............ 210/490; 210/641; 210/650; 210/653

(58) Field of Classification Search
    USPC ........ 210/490, 321.75, 321.84, 641, 650, 653
    See application file for complete search history.

(56) References Cited

U.S. PATENT DOCUMENTS

| | | | |
|---|---|---|---|
| 4,719,058 A | 1/1988 | Komoda | |
| 5,186,833 A * | 2/1993 | Mchenry et al. | 210/321.75 |
| 5,194,200 A * | 3/1993 | Anderson et al. | 210/510.1 |
| 6,596,173 B1 | 7/2003 | Chaufer et al. | |
| 7,717,272 B2 * | 5/2010 | Isomura et al. | 210/500.25 |
| 2001/0001453 A1 * | 5/2001 | Thoraval | 210/490 |
| 2005/0087070 A1 | 4/2005 | Odaka et al. | |
| 2008/0006574 A1 * | 1/2008 | Ramaswamy et al. | 210/490 |
| 2008/0093291 A1 | 4/2008 | Isomura et al. | |

FOREIGN PATENT DOCUMENTS

| | | |
|---|---|---|
| JP | 61-238315 A1 | 10/1986 |
| JP | 03-267129 A1 | 11/1991 |
| JP | 2001-212401 A1 | 8/2001 |
| JP | 2001-276586 A1 | 10/2001 |
| JP | 2003-245530 A1 | 9/2003 |
| JP | 2005-095851 A1 | 4/2005 |

OTHER PUBLICATIONS

T. Tsuru et al., "*Silica-Zirconia Membranes for Nanofiltration*," Journal of Membrane Science, vol. 149, 1998, pp. 127-135.

* cited by examiner

*Primary Examiner* — Nam Nguyen
*Assistant Examiner* — Madeline Gonzalez
(74) *Attorney, Agent, or Firm* — Burr & Brown (57) ABSTRACT

There is provided a ceramic filter provided with a ceramic porous membrane having few defects, small and uniform membrane thickness, and high resolution performance. The ceramic filter includes: a porous substrate which is a microfiltration membrane (MF membrane), a titania UF membrane which is an ultrafiltration membrane (UF membrane) formed on the porous substrate and has an average pore size of 2 to 20 nm and an average thickness of 0.1 to 1.0 μm, and a silica membrane which is formed on the titania UF membrane and a ceramic porous membrane a part of which has penetrated into pores of the titania UF membrane or into pores of the UF membrane and the porous substrate.

17 Claims, 4 Drawing Sheets

CERAMIC FILTER

FIELD OF THE INVENTION

The present invention relates to a ceramic filter and, more specifically, to a ceramic filter having few defects and thin and uniform membrane thickness.

BACKGROUND OF THE INVENTION

There has conventionally been known various methods for forming a ceramic porous membrane on a porous substrate. For example, a hot coat method is a method where a porous membrane is formed by application on the outer surface of a heated tube substrate by the use of fabric containing silica sol with rubbing the fabric against the tube substrate (Non-Patent Document 1)

There has been known also a method where a porous membrane is formed by filtration formation on the inner surface of a porous substrate of a monolith shape of a tube shape or a circular cylindrical lotus root shape (see Patent Documents 1 and 2), where a membrane is formed on the inner surface of the porous substrate by maintaining the pressure to be lower on the outer surface side than that on the inner surface side, where the sol is brought into contact, of the porous substrate.
Patent Document 1: JP-A-3-267129
Patent Document 2: JP-A-61-238315
Non-Patent Document 1: journal of Membrane Science 149 (1988) 127-135

However, the hot coat method has a problem that uniform membrane cannot be formed on the entire surface of the substrate and a problem that a membrane can be formed only on the outer surface of the tube. In addition, the method cannot be applied to a monolith type substrate. On the other hand, in the filtration membrane formation method, a solvent present in pores of the substrate may flow out toward the membrane side upon drying after forming the membrane to cause peeling of the membrane. As a result, there arises a problem that a porous membrane formed on the surface of the substrate after firing has a defect. In addition, though the dipping method can be applied to a monolith type substrate, the number of membrane formation operations is large.

The present invention aims to provide a ceramic filter which is formed by a small number of membrane formation operations, has few defects, has a thin and uniform membrane thickness, and high resolution.

SUMMARY OF THE INVENTION

The present inventors found out that the aforementioned problems can be solved by forming a ceramic porous membrane having an average pore size smaller than that of an ultrafiltration membrane on the ultrafiltration membrane formed on a porous substrate and having an average membrane thickness of 0.1 to 1.0 µm. That is, according to the present invention, the following ceramic filter is provided.

[1] A ceramic filter comprising: a porous substrate, an ultrafiltration membrane which is formed on the porous substrate and has an average thickness of 0.1 to 1.0 µm and an average pore size of 2 to 20 nm, and a ceramic porous membrane which is formed, on the ultrafiltration membrane and a part of which has penetrated into pores of the ultrafiltration membrane.

[2] The ceramic filter according to [1], wherein a part of the ceramic porous membrane has penetrated into pores of the ultrafiltration membrane and the porous substrate.

[3] The ceramic filter according to [1] or [2], wherein the ultrafiltration membrane has an average thickness of 0.1 to 0.6 µm and an average pore size of 6 to 20 nm.

[4] The ceramic filter according to any one of [1] to [3], wherein the porous substrate is a titania membrane or an alumina membrane.

[5] The ceramic filter according to any one of [1] to [4], wherein the ceramic porous membrane is a silica membrane.

By forming a ceramic porous membrane having the average pore size smaller than that of an ultrafiltration membrane on the ultrafiltration membrane formed on the porous substrate and having an average pore size of 2 to 20 mm, which is smaller than that of the porous substrate, and an average membrane thickness of 0.1 to 1.0 µm, a thin ceramic porous membrane having few defects can be formed. By controlling the average membrane thickness of the ultrafiltration membrane to be 0.1 to 1.0 µm, a part of the ceramic porous membrane penetrates into the ultrafiltration membrane or into the ultrafiltration membrane and the porous substrate, and thereby local segregation of the ceramic can be inhibited, and peeling off of the membrane, which is a cause of the hindrance to the separation performance, can be inhibited. In addition, since a part of the ceramic porous membrane penetrates into the porous substrate, membrane strength of the ultrafiltration membrane increases, and adhesion strength between the ultrafiltration membrane and the porous substrate improves. Therefore, peeling of the ultrafiltration membrane unitarily joined with the ceramic porous membrane from the porous substrate can be inhibited.

As described above, according to the present invention, there can be obtained a high flux ceramic filter having a dehydrating action with high resolution performance at low costs. In the case of employing a silica, membrane as the ceramic porous membrane, it is particularly suitable for dehydration of alcohol such as ethanol and isopropyl alcohol and dehydration of organic acid such as acetic acid.

DESCRIPTION OF REFERENCE NUMERALS

1: silica membrane, 10: ceramic filter, 11: porous substrate, 14: titania UF membrane, 22: partition wall, 23: cell, 25: inlet side end face, 30: coating liquid (titania sol), 31; Q-ring, 32: casing, 33; vacuum pump, 40: coating iiguid (silica sol), 41: masking tape

DETAILED DESCRIPTION OF THE INVENTION

Hereinbelow, embodiments of the present invention will be described with referring to drawings. The present invention is by no means limited to the following embodiments, and changes, modifications, and improvements may be added as long as they do not deviate from the scope of the invention.

Figure 1:
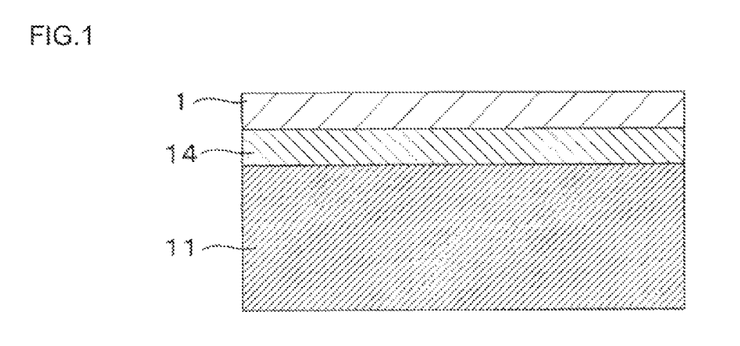
FIG. 1 is a cross-sectional view of a ceramic filter as one embodiment of the present invention.

FIG. 1 shows a partially enlarged cross-sectional view of a ceramic filter as one embodiment of the present invention. On the porous substrate 11 which is a microfiltration membrane (MF membrane), a titania UF membrane 14 which is an ultrafiltration membrane (UF membrane) having an average pore size smaller than that of the porous substrate 11 is formed, and, on the titania UF membrane 14, a silica membrane 1 having an average pore size smaller than that of the titania UF membrane 14 is formed.

The porous substrate 11 is a microfiltration membrane (MF membrane) and preferably has an average pore size of 0.1 to 0.6 μm on the outermost layer.

In addition, on the porous substrate 11, the titania UF membrane 14 of an ultrafiltration membrane having an average membrane thickness of 0.1 to 1.0 μm (more preferably 0.1 to 0.6 μm) and an average pore size of 2 to 20 nm (more preferably 6 to 20 nm) is formed, and the silica membrane 1 having an average pore size smaller than that of the titania UF membrane 14 is formed on the titania UF membrane 14.

When the average membrane thickness of the ultrafiltration membrane is above 1.0 μm, since water permeation of ceramic sol in the ultrafiltration membrane is slow, the ceramic sol does not penetrate into the ultrafiltration membrane sufficiently, and the ceramic sol remains on the surface of the ultrafiltration membrane, and thereby local segregation is caused to easily cause peeling of the membrane. In addition, since the membrane strength of the ultrafiltration membrane is week, peeling of the ultrafiltration membrane unitarily joined with the ceramic porous membrane from the porous substrate is easily caused. On the other hand, when the average membrane thickness of the ultrafiltration membrane is below 0.1 μm, since the ultrafiltration membrane cannot cover the entire surface of the porous substrate, there is caused trouble of impossible forming of the ceramic porous membrane. The average thickness of a conventional titania UF membrane is 1.5 μm, and there was a problem of having segregation of silica.

When the average pore size of the ultrafiltration membrane is smaller than 2 nm, the ceramic sol cannot penetrate into the pores of the ultrafiltration membrane, and local segregation of ceramic is caused on the surface of the ultrafiltration membrane to easily cause peeling of the membrane. In addition, when the average pore size of the ultrafiltration membrane is larger than 20 nm, it seems that the ceramic sol penetrates into the porous substrate too much to cause a problem that a ceramic porous membrane is not formed on the ultrafiltration membrane.

Here, "a part of the ceramic porous membrane penetrates into the ultrafiltration membrane and the porous substrate" means that the average value of the weight ratio of ceramic porous membrane material/ultrafiltration membrane material or porous substrate is 0.1 or more and that the standard deviation is 0.035 or less when measurement is performed at 10 points selected at random in the ultrafiltration membrane and the porous substrate by spot analysis by EDX element analysis. Further, in the case of a long ceramic filter having a lotus-shaped monolith structure, it means that the average value of the weight ratio of ceramic porous membrane material/ultrafiltration membrane material or porous substrate is 0.1 or more and that the standard deviation is 0.035 or less when measurement is performed in the outermost peripheral cell position and the central cell position in each of the sites of 10%, 50%, and 90% of the entire length from an end face in the longitudinal direction of the filter.

Figure 2:
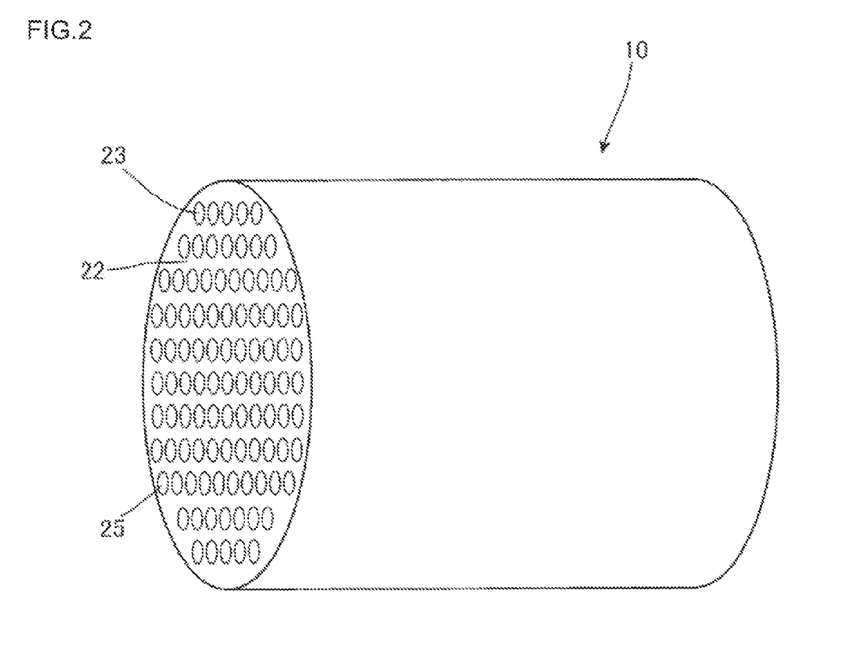
FIG. 2 is a perspective view showing a ceramic filter as one embodiment of the present invention.

Next, using FIG. 2, one embodiment of a ceramic filter 10 of the present invention will be described. The ceramic filter 10 of the present invention has a monolith shape having a plurality of cells 23 partitioned and formed by partition walls 22 and forming fluid passages in the axial direction. In the present embodiment, each cell 23 has a circular cross section, and a silica membrane 1 as shown in FIG. 1 is formed on the inner wall surface. The cell 23 may be formed to have a cross section of a polygonal shape such as a quadrangle or a rectangle. According to such a structure, for example, when a mixture (e.g., water and acetic acid) is introduced from the inlet side end face 25 into the cell 23, one of the constituents constituting the mixture is separated at the silica membrane 1 formed on the cell 23 inner wall, penetrates the porous partition walls 22 and is discharged from the outermost wall of the ceramic filter 10. Therefore, it can separate mixture. That is, the silica membrane 1 formed on the ceramic filter 10 can be used as a separation membrane and has high separation property for, for example, water and acetic acid.

The porous substrate 11 serving as the substrate main body is formed as a monolith type filter element made of porous material and having a circular cylindrical shape by extrusion forming or the like. As the porous material, alumina can be used, for example, from, the viewpoints of corrosion resistance, little change in pore size of the filtration portion by temperature change, and capability of obtaining sufficient strength. However, besides alumina, a ceramic material such, as titania, cordierite, mullite, or silicon carbide can be used.

Since the silica membrane 1 of the present invention is formed on the inner peripheral face (inner wall face) of the porous substrate 11, there may suitably be used a relatively long cylindrical substrate having a length of 50 cm or more or a porous substrate having a lotus root shape.

Then, on the porous substrate 11, a titania UF membrane 14 is formed, and, on the titania UF membrane 14, the silica membrane 1 is formed. That is, the ultrafiltration membrane (UF membrane) is formed on a face, where at least the silica membrane 1 is formed, of the substrate made of porous material. The ultrafiltration membrane is a membrane for blocking particles or polymers in the range of 0.1 μm to 2 nm, and a titania membrane is desirably formed. In addition, the average pore size of the titania membrane is smaller than that of the porous substrate.

AS a titania UF membrane 14 formation method, there is employed, for example, a method where a membrane is formed by a filtration membrane formation method (see Patent Documents 1 and 2). In the first place, there is prepared a coating liquid (titania sol) 30 for forming the titania UF membrane 14. In the coating liquid (titania sol) 30, titanium isopropoxide is subjected to hydrolysis in the presence of nitric acid to obtain sol, the sol is diluted with water, and an organic binder is suitably added thereto. It is possible to dilute the sol with ethanol in place of water.

Figure 3:
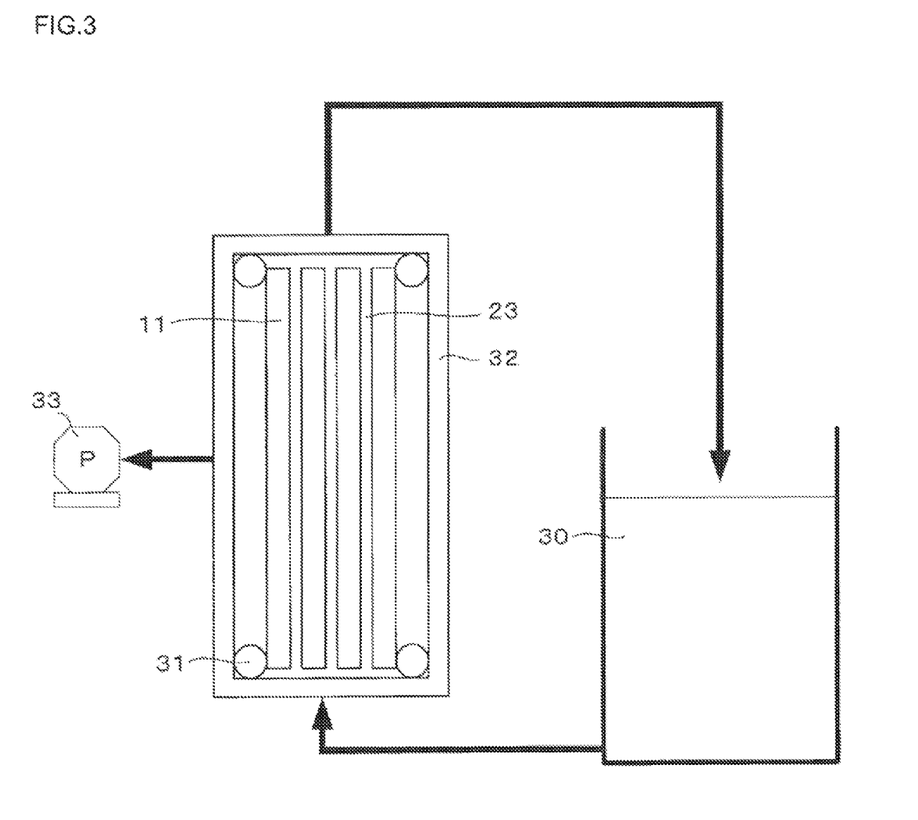
FIG. 3 is a schematic view showing an example of a titania UF membrane formation method of a ceramic filter of the present invention.

Next, as shown in FIG. 3, the porous substrate 11 is disposed in a casing 32 in the state that both the end faces are sealed with O-rings 31 or the like. With circulating the aforementioned coating liquid (titania sol) 30 in the cells 23, low pressure is maintained by a vacuum pump 33 on the outer peripheral side face side of the porous substrate 11 for a predetermined time to form a titania UF membrane 14 on the inner surface of the porous substrate 11. Then, after drying, it was subjected to a thermal treatment at 500° C. At this time, the average membrane thickness of the titania UF membrane 14 is controlled to be 0.1 to 1.0 μm. The average membrane thickness of the titania UF membrane 14 can be adjusted by the titania concentration of the coating liquid (titania sol) 30. That is, the thickness of the membrane can be decreased by lowering the sol concentration, while the thickness of the membrane can be increased by raising the sol concentration. In addition, also, by repeated formation of membrane, the thickness of the titania UF membrane 14 can be increased.

Further, at this time, the average pore size of the titania UF membrane 14 is controlled to be 2 to 20 nm. The average pore size of the titania UF membrane 14 can be adjusted by the amount of the organic binder added thereto. That is, the pore size can be decreased by reducing the binder amount, while the pore size can be increased by increasing the binder amount. In addition, also, by raising the firing temperature, the pore size can be increased. The titania UF membrane 14 formation method may be also a general dipping method instead of the filtration membrane formation method. Though the case of using titania for the UF membrane has been described, the UF membrane is not limited to this case, and a zirconia membrane or a zeolite membrane may be employed.

Further, a silica membrane 1 formation method will be described by the use of FIG. 4. In the first place, there is prepared a coating liquid (silica sol) 40 for forming the silica membrane 1. In the coating liquid (silica sol) 40, tetraethoxysilane is subjected to hydrolysis in the presence of nitric acid to obtain sol, the sol is diluted with ethanol. It is possible to dilute the sol with water in place of ethanol.

Figure 4:
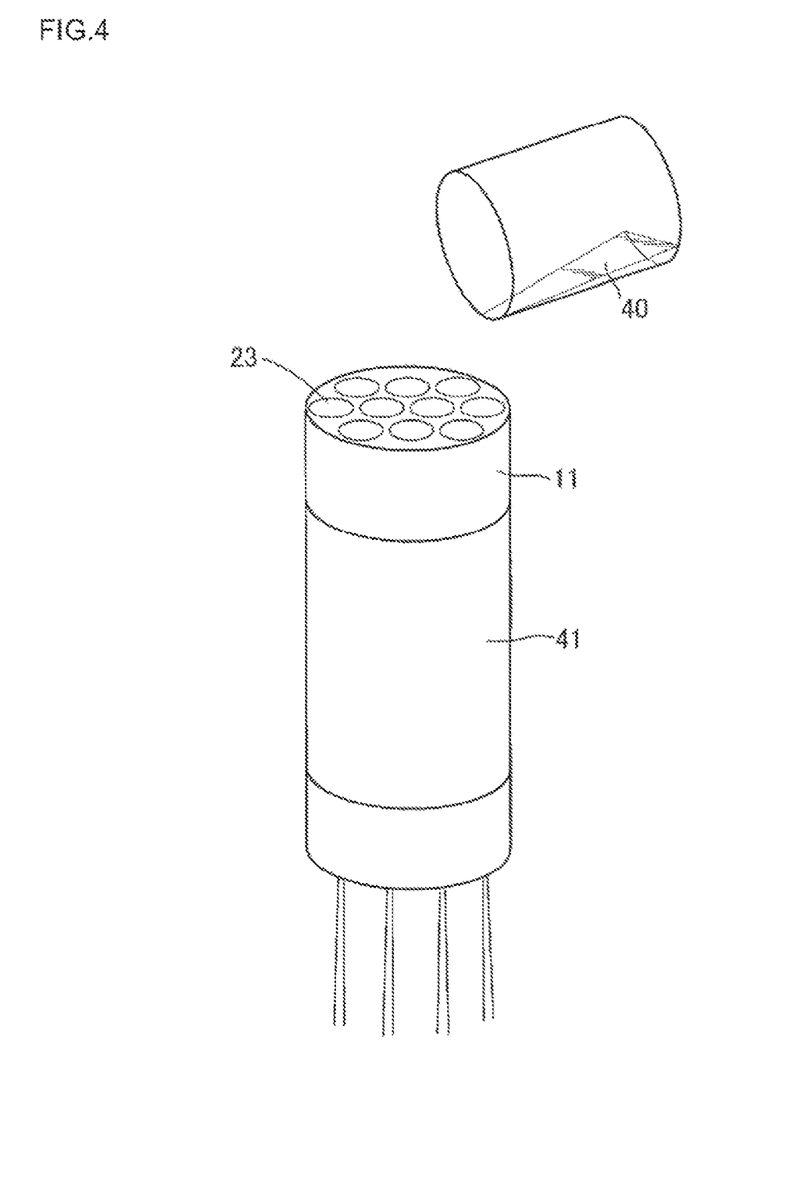
FIG. 4 is a schematic view showing an example of a silica membrane formation method of a ceramic filter of the present invention.

Next, as shown in FIG. 4, the outer peripheral side face of the porous substrate 11 where the titania UF membrane 14 is formed is sealed with a masking tape 41. For example, the porous substrate 11 is fixed at the bottom end of a wide-mouth funnel (not illustrated), and the aforementioned coating liquid (silica sol) 40 is poured from the top portion of the substrate to pass it through the cells 23. Alternatively, a membrane formation process by general dipping may be employed instead of this method. Then, temperature is raised at a rate of 100° C./hr, and, after the temperature is maintained at 500° C. for one hour, temperature is lowered at a rate of 100° C./hr. The aforementioned operations of pouring of the coating liquid (silica sol) 40, drying, raising temperature, and lowering temperature are repeated four times.

Figure 5A:
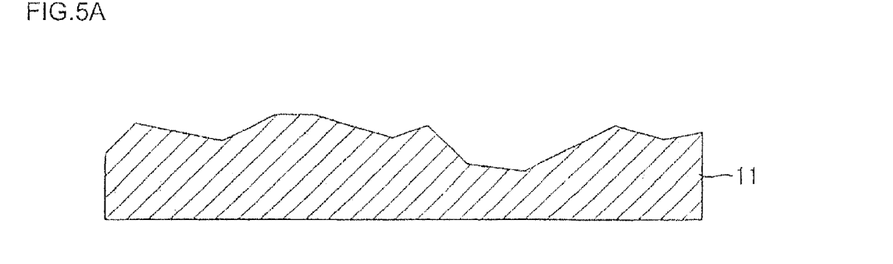
FIG. 5A is a view showing a porous substrate before forming a silica membrane, explaining the silica membrane in the case that a titania UF membrane is formed.
Figure 5B:
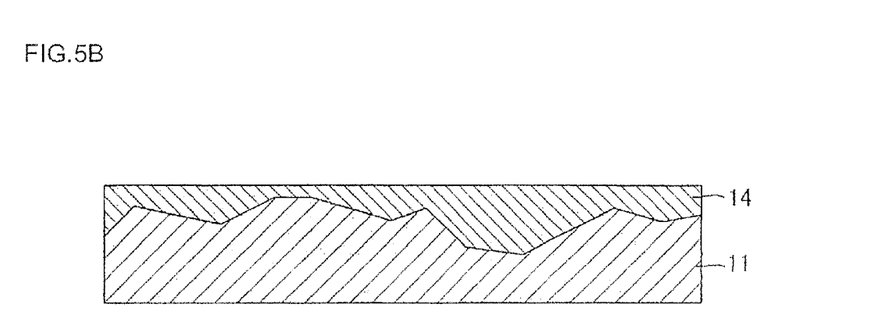
FIG. 5B is a view where a titania UF membrane is formed on the porous substrate/following FIG. 5A.
Figure 5C:
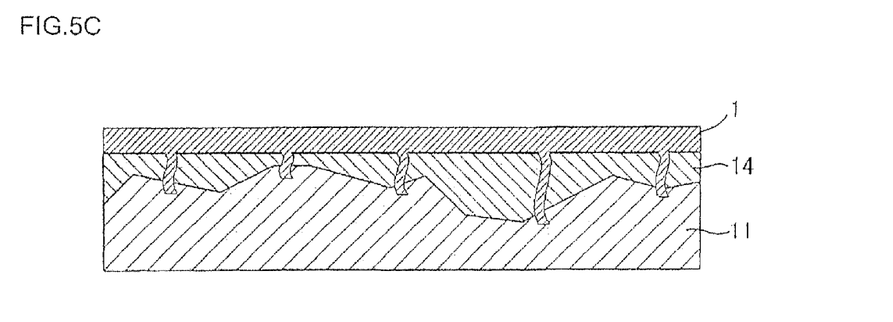
FIG. 5C is a view where a silica membrane is formed on the titania UF membrane, following FIG. 53.

By the aforementioned steps, the titania UF membrane 14 is formed on the porous substrate 11, and the silica membrane 1 is formed on the titania UP membrane 14. That is, since the titania UF membrane 14 is formed as shown in FIG. 5B on a porous membrane 11 shown in FIG. 5A, the influence by unevenness of the surface of the porous substrate 11 is reduced by the titania UP membrane 14. Therefore, as shown in FIG. 5C, even if the silica membrane is made thin, it can be formed with few defects. Further, by controlling the average thickness of the titania UF membrane 14 to be 0.1 to 1.0 µm, the silica membrane 1 having not only high flux and low cost but also high separation performance can be obtained.

The thus obtained ceramic filter 10 having a nano-level thin membrane-shaped silica membrane 1 formed on the inner wall surface can suitably be used as a filter for separating a mixed liquid or the like. Incidentally, by further immersing or permeating the cells 23 in acetic acid, the separation coefficient can further be improved. In addition, in the aforementioned embodiment, the case of a silica membrane as the ceramic porous membrane was described. However, it is not limited to the case, and a titania membrane, a zirconia membrane, a zeolite membrane, and the like, and a mixture of them may be employed.

EXAMPLE

Hereinbelow, a manufacturing method of the present invention will be described more specifically by Examples. However, the present invention is by no means limited to these Examples. In the first place, the porous substrate, ceramic sol, membrane formation method, and the like used in the Examples will be described.

Examples 1 to 16

(1) Porous Substrate

There was used as the substrate a monolith-shaped (outer diameter of 30 mm and length of 500 mm with 37 cells each having inner diameter of 3 mm) porous article of an alumina microfiltration membrane having an average pore size of 0.2 µm. Incidentally, both the end portions of the substrate were sealed with glass. The average pore size of the substrate was measured according to the air flow method described in ASTM F306.

(2) Titania Sol

Titanium isopropoxide was subjected to hydrolysis in the presence of nitric acid to obtain titania sol. The sol particle diameter measured by a kinetic light scattering method was 100 nm.

(3) Titania UF Membrane Formation

The titania sol was diluted with water, and PVA as an organic binder was suitably added thereto to obtain sol for membrane formation. The sol was circulated in the cells of the substrate and brought into contact with the cells to form a titania UF membrane in the cells. The thickness of the titania UF membrane was controlled by adjusting the titania concentration in the sol and/or the number of membrane formation operations. That is, in the case of increasing the thickness, the titania concentration in the sol was raised, and/or the number of membrane formation operations was increased. In the case of reducing the thickness, the titania concentration in the sol was lowered, and/or the number of membrane formation operations was decreased. The pore size of the titania UF membrane was controlled by adjusting the amount of the organic binder and/or the firing temperature. That is, in the case of increasing the pore size, the amount of the organic binder was increased, and/or the firing temperature was raised. In the case of decreasing the pore size, the amount of the organic binder was decreased, and/or the firing temperature was lowered.

(4) Drying, Firing

After the samples were dried, they were subjected to a thermal treatment at 500° C. They served as the titania UF substrates where a titania UF membrane was formed, and the average pore size and the average membrane thickness of the titania UF membrane were measured. Though the principle of the measurement of the average pore size was the same as that of the method described in the Non-Patent Document 1, whereas wafer vapor and nitrogen were used, in the Non-Patent Document 1, n-hexane and nitrogen were used in the measurement method used in the present invention. The average thickness was observed by an electron microscope. In Examples 1 to 16, as measurement results, as shown, in Table 1, the average pore size was within the range from 2 to 20 nm, and the average membrane thickness was within the range from 0.10 to 1.00 μm.

(5) Silica Sol

Tetraethoxysilane was subjected to hydrolysis in the presence of nitric acid to obtain silica sol, the silica sol was diluted with ethanol and adjusted to be 0.7 mass % in terms of silica to obtain a sol for forming a silica membrane.

(6) Formation of Silica Membrane

The outer peripheral side face of each sample (titania UF substrate) was sealed with a masking tape. The titania UF substrate was fixed at the bottom end of a wide-mouth funnel, and the silica sol of 60 ml was poured from the top portion of the substrate and passed through the cells. Incidentally, by this membrane formation step, it was confirmed that the silica membrane was formed entirely on the inner wall side.

(7) Drying

Drying was performed for one hour by the use of a dryer to pass a wind at room temperature through the cells of the titania UF substrate where the silica sol was poured.

(8) Firing

The temperature of the samples was raised at a rate of 100° C./hr, and, after the temperature was maintained at 500° C. for one hour, the temperature was lowered at a rate of 100° C./hr. Incidentally, the operations of the above (6) to (8) were repeated four times to obtain ceramic filters of Examples 1 to 16. At this time, silica had penetrated into the titania UF membrane or into the titania UF membrane and the porous substrate. That is, by spot analysis by EDX element analysis, measurement was performed at 10 points selected at random in the titania UF membrane and the porous substrate, and it was confirmed that the average value of the weight ratio of silica/titania oxide was 0.1 or more and that the standard deviation was 0.035 or less. In addition, it was confirmed that the average value of the weight ratio of silica/titania oxide was 0.1 or more and that the standard deviation was 0.035 or less also in the outermost peripheral, cell position and the central ceil position in each of the sites of 10%, 50%, and 90% of the entire length from an end face in the longitudinal direction of the honeycomb filter of each Example.

Examples 17 to 32

Ceramic filters of Examples 17 to 32 were manufactured in the same manner as in the ceramic filters of Examples 1 to 16 except that titania was employed as the material for the porous substrates.

Comparative Example 1 to 4

Ceramic filters of Comparative Examples 1 to 4 were manufactured in the same manner as in the ceramic filters of Examples 1 to 16. As shown in Table 1, the titania UF membrane had an average pore size of 2 to 20 nm and an average thickness of 1.5 μm. At this time, silica had penetrated into neither the titania UF membrane nor the porous substrate.

Comparative Example 5

A ceramic filter of Comparative Example 5 was manufactured in the same manner as in the ceramic filters of Examples 1 to 16. As shown in Table 1, the titania UF membrane had an average pore size of 40 nm and an average thickness of 0.6 μm. At this time, though silica penetrated into the titania UF membrane and the porous substrate, it was found out by observation of the titania UF membrane with an electron microscope that the entire surface of the porous substrate was not covered, with the titania UF membrane to allow a part of the surface of the porous substrate to be exposed.

Comparative Example 6

A ceramic filter of Comparative Example 6 was manufactured in the same manner as in the ceramic filters of Examples 1 to 16. As shown in Table 1, the titania UF membrane had an average pore size of 1 nm and an average thickness of 0.6 μm. At this time, silica had penetrated into neither the titania UF membrane nor the porous substrate.

Comparative Example 7

Though ceramic filter of Comparative Example 7 was manufactured, in the same manner as in the ceramic filters of Examples 1 to 16, the average pore size of the titania UF membrane could not be measured. The titania UF membrane was observed with an electron microscope, and it was found out that the entire surface of the porous substrate was not covered with the titania UF membrane to allow a part of the surface of the porous substrate to be exposed. It has been known that the sample weight increase amount before and after the UF membrane formation upon titania UF membrane formation and the practical average UF membrane thickness of Examples 1 to 16 and Comparative Examples 1 to 4 have a relation of a proportional line passing through the zero point, and the estimated, average UF membrane thickness obtained by calculation using the proportional line and the sample weight increase amount after the UF membrane formation of Comparative Example 7 was 0.05 μm as shown in Table 1. The subsequent silica membrane forming steps were the same as in Example 1. The amount of silica, which had penetrated into the titania UF membrane at this time could not be measured because the titania UF membrane was too thin.

With regard to Examples 1 to 32 and Comparative Examples 1 to 7, a pervaporation separation test was performed for two hours by circulating 90% ethanol at 70° C. in the filter cells at a flow rate of 10 L/min, and vacuuming the outside of the filter to foe 2 to 10 Pa. The permeability rate was calculated from the amount of the liquid permeated from the time after one and half hours to the time after two hours from the start of the test, and the separation coefficient α was calculated by the following formula from ethanol and water concentrations of the permeated liquid, α={[original liquid water mol concentration]/[original liquid ethanol mol concentration]}/([permeated liquid water mol concentration]/[permeated liquid ethanol mol concentration]). The relation between the separation coefficient α and permeation rate, which is the result of the separation test of Examples 1 to 32 and Comparative Examples 1 to 7, is shown in Table 1.

TABLE 1

| | Structure of porous substrate | | Structure of ultrafiltration membrane (titania UF membrane) | | | Property of ceramic porous membrane (silica membrane) | |
|---|---|---|---|---|---|---|---|
| | Material | Silica weight ratio in substrate | Average membrane thickness [μm] | Average pore size [nm] | Silica weight ratio in UF membrane | Separation coefficient α | Permeation rate [kg/m²hr] |
| Example 1 | Alumina | 0 | 1.0 | 20 | 0.1 | 2000 | 2.2 |
| Example 2 | Alumina | 0 | 1.0 | 15 | 0.3 | 3000 | 1.8 |
| Example 3 | Alumina | 0 | 1.0 | 6 | 0.3 | 2500 | 1.9 |
| Example 4 | Alumina | 0 | 1.0 | 2 | 0.1 | 1500 | 2.4 |
| Example 5 | Alumina | 0.2 | 0.6 | 20 | 0.4 | 4000 | 1.6 |
| Example 6 | Alumina | 0.1 | 0.6 | 15 | 0.6 | 5500 | 1.4 |
| Example 7 | Alumina | 0 | 0.6 | 6 | 0.6 | 5000 | 1.5 |
| Example 8 | Alumina | 0 | 0.6 | 2 | 0.4 | 3500 | 1.8 |
| Example 9 | Alumina | 0.5 | 0.3 | 20 | 0.6 | 4000 | 1.8 |
| Example 10 | Alumina | 0.5 | 0.3 | 15 | 0.8 | 5000 | 1.5 |
| Example 11 | Alumina | 0.1 | 0.3 | 6 | 0.8 | 5500 | 1.4 |
| Example 12 | Alumina | 0 | 0.3 | 2 | 0.6 | 3500 | 1.8 |
| Example 13 | Alumina | 1.1 | 0.1 | 20 | 0.8 | 3000 | 2.2 |
| Example 14 | Alumina | 0.8 | 0.1 | 15 | 1 | 3500 | 1.8 |
| Example 15 | Alumina | 0.4 | 0.1 | 6 | 1 | 3000 | 1.9 |
| Example 16 | Alumina | 0.2 | 0.1 | 2 | 0.8 | 2000 | 2.4 |
| Example 17 | Titania | 0 | 1.0 | 20 | 0.1 | 2000 | 2.2 |
| Example 18 | Titania | 0 | 1.0 | 15 | 0.3 | 2500 | 2.1 |
| Example 19 | Titania | 0 | 1.0 | 8 | 0.3 | 2500 | 2.1 |
| Example 20 | Titania | 0 | 1.0 | 2 | 0.1 | 1500 | 2.4 |
| Example 21 | Titania | 0.1 | 0.6 | 20 | 0.4 | 3500 | 1.8 |
| Example 22 | Titania | 0 | 0.6 | 15 | 0.6 | 3500 | 1.8 |
| Example 23 | Titania | 0 | 0.6 | 6 | 0.6 | 3500 | 1.8 |
| Example 24 | Titania | 0 | 0.6 | 2 | 0.4 | 3000 | 1.9 |
| Example 25 | Titania | 0.5 | 0.3 | 20 | 0.6 | 5000 | 1.5 |
| Example 26 | Titania | 0.4 | 0.3 | 15 | 0.8 | 5500 | 1.4 |
| Example 27 | Titania | 0 | 0.3 | 6 | 0.8 | 4000 | 1.6 |
| Example 28 | Titania | 0 | 0.3 | 2 | 0.6 | 3500 | 1.8 |
| Example 29 | Titania | 1 | 0.1 | 20 | 0.8 | 3000 | 1.4 |
| Example 30 | Titania | 0.8 | 0.1 | 15 | 1 | 3500 | 1.4 |
| Example 31 | Titania | 0.5 | 0.1 | 6 | 1 | 3000 | 1.5 |
| Example 32 | Titania | 0.3 | 0.1 | 2 | 0.8 | 2500 | 1.5 |
| Comp. Ex. 1 | Alumina | 0 | 1.5 | 20 | 0.03 | 300 | 3.5 |
| Comp. Ex. 2 | Alumina | 0 | 1.5 | 15 | 0.05 | 500 | 3 |
| Comp. Ex. 3 | Alumina | 0 | 1.5 | 6 | 0.05 | 500 | 3 |
| Comp. Ex. 4 | Alumina | 0 | 1.5 | 2 | 0.03 | 300 | 3.5 |
| Comp. Ex. 5 | Alumina | 0.3 | 0.6 | 40 | 2 | 500 | 3 |
| Comp. Ex. 6 | Alumina | 0 | 0.6 | 1 | 0 | 500 | 3 |
| Comp. Ex. 7 | Alumina | 5 | 0.05 (estimation) | Measurement impossible | Measurement impossible | 10 | 7 |

As shown in Table 1, each of Examples 1 to 32 showed higher α (separation coefficient) than that of Comparative Examples 1 to 7. Comparative Example 7 had the lowest α, which was merely 10. As a result of observation of a membrane surface of each sample with an electron microscope, a flat and smooth membrane surface with no defect was observed in each of Examples 1 to 16. In each of Comparative Examples 1 to 4 and 6, a mark having a size of 10 to 100 μm of peeling of the membrane was confirmed. In addition, it was found out that silica segregated in the vicinity of the membrane peeling from the results of the surface element analysis EPMA observation. In examples 5 and 7, a portion where a surface of the porous substrate was exposed was observed. Each of Comparative Examples 1 to 4 had bad permeability of silica sol since the titania UF average membrane thickness was large, and the silica sol remained or silica segregation was caused on the surface of the titania UF membrane, which seems to have caused membrane peeling upon drying and firing. In Comparative Example 5, since the titania UF pores were too large, the silica sol could not stay in the titania UF pores to have low titania UF membrane strength, which seems to have caused membrane peeling upon drying and firing. In Comparative Example 6, since the titania UF pores were too small, it had bad silica sol permeability, and the silica sol remained or silica segregation was caused on the surface of the titania UF membrane, which seems to have caused membrane peeling upon drying and firing. Each of Examples 1 to 32 had smaller titania UF average membrane thickness and better permeability of silica sol than those of each of Comparative Examples 1 to 4, and thereby no silica sol remained on the titania UF membrane surface, which seems to be the reason that a homogeneous silica membrane could be formed. In Comparative Example 7, since the titania UF membrane could not cover the entire surface of the porous substrate, the silica membrane located thereon could not cover the entire surface of the base, which seems to have caused low α.

When Examples 1 to 16 are compared with one another depending on the average pore size of the titania UF membrane, each of Examples 5 to 16, each of which has a titania UF average membrane thickness of 0.1 to 0.6 μm, showed higher α than that of each of Examples 1 to 4, each of which has a titania UF average membrane thickness of 1.0 μm. This seems to have been caused by the tendency of falling of α because of insufficient penetration of the silica sol into the titania UF pores and the porous substrate because the titania UF average thickness is large. In addition, in each titania UF average membrane thickness of 0.1 to 0.6 μm showing high α, α is high when the titania UP average pore size is 6 to 20 nm, and α is lower when the titania UF average pore size is 2 nm. As the titania UF average pore size was too small, the silica sol hardly penetrated into the titania UF pore and the porous substrate, and the silica sol remained or silica segregation was caused on the surface of the titania UF membrane, which seems to have caused membrane peeling upon drying and firing. That is, as suitable conditions for the titania UF membrane, the average membrane thickness is 0.1 to 0.6 µm, and the average pore size is 6 to 20 nm. As more suitable conditions, the average membrane thickness is 0.3 to 0.6 µm, and the average pore size is 6 to 20 nm. In addition, the aforementioned tendencies were observed similarly in Examples 17 to 32, where titania was used as the material for the porous substrate.

As described above, by controlling the average membrane thickness and the average pore size of the titania UF membrane formed on the porous substrate to be within, suitable ranges, a thin silica dehydration membrane having few defects can be formed to obtain a ceramic filter having high performance. That is, the suitable range of the titania UF average membrane thickness is 0.1 to 1.0 µm, more preferably 0.1 to 0.6 µm, and the suitable range of the titania UF average pore size is 2 to 20 nm, more preferably 6 to 20 nm.

INDUSTRIAL APPLICABILITY

According to the present invention, there can be obtained a thin and uniform ceramic porous membrane can be obtained with few defects, and a ceramic filter having such a membrane formed thereon can suitably be used as a filter having high separation performance and high flux. In addition, a ceramic filter having a thin silica membrane of a nano-level thickness formed on the inner wall surface can be used in a site where an organic filter cannot be used, for example, separation removal in an acid or alkali solution, an organic solvent, or the like.

The invention claimed is:

1. A ceramic filter comprising: a porous substrate, an ultrafiltration membrane which is formed on the porous substrate and has an average thickness of 0.1 to 1.0 µm and an average pore size of 2 to 20 nm, and a ceramic porous membrane covering the entire upper surface of the ultrafiltration membrane such that a part of the ceramic porous membrane has penetrated into pores of the ultrafiltration membrane and the porous substrate.

2. The ceramic filter according to claim 1, wherein the ultrafiltration membrane has an average thickness of 0.1 to 0.6 µm and an average pore size of 6 to 20 nm.

3. The ceramic filter according to claim 1, wherein the porous substrate is a titania membrane or an alumina membrane.

4. The ceramic filter according to claim 1, wherein the ceramic porous membrane is a silica membrane.

5. The ceramic filter according to claim 1, wherein the ultrafiltration membrane has an average thickness of 0.1 to 0.6 µm and an average pore size of 6 to 20 nm.

6. The ceramic filter according to claim 1, wherein the porous substrate is a titania membrane or an alumina membrane.

7. The ceramic filter according to claim 2, wherein the porous substrate is a titania membrane or an alumina membrane.

8. The ceramic filter according to claim 5, wherein the porous substrate is a titania membrane or an alumina membrane.

9. The ceramic filter according to claim 3, wherein the ceramic porous membrane is a silica membrane.

10. The ceramic filter according to claim 2, wherein the ceramic porous membrane is a silica membrane.

11. The ceramic filter according to claim 3, wherein the ceramic porous membrane is a silica membrane.

12. The ceramic filter according to claim 5, wherein the ceramic porous membrane is a silica membrane.

13. The ceramic filter according to claim 6, wherein the ceramic porous membrane is a silica membrane.

14. The ceramic filter according to claim 7, wherein the ceramic porous membrane is a silica membrane.

15. The ceramic filter according to claim 8, wherein the ceramic porous membrane is a silica membrane.

16. The ceramic filter according to claim 1, wherein an average of a weight ratio of the ceramic porous membrane/ultrafiltration membrane is 0.1 or more and a standard deviation is 0.035 or less.

17. The ceramic filter according to claim 1, wherein the ceramic filter has a separation coefficient of 1500 or more using the following equation:

$$\alpha = ([\text{original liquid water mol concentration}]/[\text{original liquid ethanol mol concentration}])/([\text{permeated liquid water mol concentration}]/[\text{permeated liquid ethanol mol concentration}]).$$

* * * * *